United States Patent [19]
Park et al.

[11] Patent Number: 5,645,906
[45] Date of Patent: Jul. 8, 1997

[54] RADIALLY-RECOVERABLE SLEEVE OF COMPOSITE

[75] Inventors: George Barry Park, Nr. Swindon; Frank James Lowe, Swindon; George Michael John Ganbuehler, Swindon; Norman Hutt, Swindon; Stephen Alan Webb, Nr. Swindon, all of England; Hendrick Graulus, Herent, Belgium

[73] Assignee: Raychem Limited, United Kingdom

[21] Appl. No.: 276,005

[22] Filed: Jul. 15, 1994

Related U.S. Application Data

[63] Continuation of Ser. No. 271,537, Jul. 7, 1994, which is a continuation of Ser. No. 985,540, Dec. 4, 1992, abandoned, which is a division of Ser. No. 552,370, Jul. 16, 1990, abandoned, which is a continuation of Ser. No. 296,480, Jan. 12, 1989, abandoned.

[30] Foreign Application Priority Data

| Jan. 12, 1988 | [GB] | United Kingdom | 8800625 |
| Aug. 11, 1988 | [GB] | United Kingdom | 8819134 |
| Aug. 22, 1988 | [GB] | United Kingdom | 8819896 |

[51] Int. Cl.⁶ .................. B29D 22/00; B65B 53/00; B32B 7/00
[52] U.S. Cl. .................. 428/36.3; 428/36.1; 428/34.9; 442/209; 442/314
[58] Field of Search .................. 428/224, 225, 428/227, 228, 229, 236, 237, 238, 239, 372, 373, 375, 377, 378, 913, 36.1, 36.3, 34.9, 35.7, 253, 35.9, 259

[56] References Cited

U.S. PATENT DOCUMENTS

| 2,424,743 | 7/1947 | Davis | 28/82 |
| 3,252,484 | 5/1966 | Meyer et al. | 139/426 |
| 3,644,866 | 2/1972 | Deardurff | 338/214 |
| 3,669,157 | 6/1972 | Woodall, Jr. et al. | 139/387 |
| 4,016,714 | 4/1977 | Crandall et al. | 57/149 |
| 4,024,002 | 5/1977 | Lott | 156/85 |
| 4,169,186 | 9/1979 | Tazaki et al. | 428/406 |
| 4,265,981 | 5/1981 | Campbell | 428/591 |
| 4,299,884 | 11/1981 | Payen | 428/377 |
| 4,620,401 | 11/1986 | L'Espérance et al. | 52/309.15 |
| 4,631,098 | 12/1986 | Pithouse et al. | 174/36 |
| 4,639,545 | 1/1987 | Pithouse et al. | 174/36 |
| 4,729,920 | 3/1988 | McLoughlin et al. | 428/229 |
| 4,800,113 | 1/1989 | O'Connor | 428/175 |
| 4,820,561 | 4/1989 | Pithouse et al. | 428/34.5 |

FOREIGN PATENT DOCUMENTS

| 0033244A2 | 8/1981 | European Pat. Off. | B29D 3/02 |
| 01170225A3 | 8/1984 | European Pat. Off. | B29C 25/00 |
| 1495136 | 9/1967 | France . | |
| 2103110 | 4/1972 | France | B29H 9/00 |
| 2423320 | 11/1979 | France | B29D 3/02 |
| 812396 | 4/1959 | United Kingdom . | |
| 824446 | 12/1959 | United Kingdom . | |
| 877347 | 9/1961 | United Kingdom . | |
| 965086 | 7/1964 | United Kingdom . | |
| 1088572 | 10/1967 | United Kingdom . | |
| 1157913 | 7/1969 | United Kingdom | B29H 9/04 |
| 1273984 | 5/1972 | United Kingdom | D02G 3/40 |
| 1331638 | 9/1973 | United Kingdom | D06M 13/00 |

(List continued on next page.)

OTHER PUBLICATIONS

Machine Design, vol. 55, No. 23, Oct. 1983, p. 64, Cleveland, Ohio, USA;"Fiber Bundle Forms Reinforced Composite".

WO-A-86/00 566 (J. Galichon) Whole Document.

Machine Design, vol. 43, No. 24, Sep. 1971, pp. 58-62, Cleveland, Ohio, USA; "Glass-Reinforced".

*Primary Examiner*—Thurman K. Page
*Assistant Examiner*—Kathryne E. Shelborne
*Attorney, Agent, or Firm*—William D. Zahrt, II; Herbert G. Burkard

[57] ABSTRACT

A cable splice case or other article for environmental sealing comprises a composite material having multifilament fibres therein, which fibres are blocked in order to prevent passage of fluid through the material in a direction parallel to its major surfaces.

30 Claims, 5 Drawing Sheets

FOREIGN PATENT DOCUMENTS

| | | | |
|---|---|---|---|
| 1347186 | 2/1974 | United Kingdom | C08G 45/00 |
| 1352755 | 5/1974 | United Kingdom | D02G 3/04 |
| 1364965 | 9/1974 | United Kingdom | D06M 15/04 |
| 1456628 | 11/1976 | United Kingdom | C08K 5/54 |
| 1484283 | 9/1977 | United Kingdom | D06M 15/52 |
| 1502840 | 3/1978 | United Kingdom | C08L 31/04 |
| 2032483 | 5/1980 | United Kingdom | D02G 3/02 |
| 2071722 | 9/1981 | United Kingdom | D02G 3/40 |
| 2103992 | 3/1983 | United Kingdom | B29C 27/12 |
| 2105247 | 3/1983 | United Kingdom | B32B 17/04 |
| 2133740 | 8/1984 | United Kingdom | D02J 1/22 |

RADIALLY-RECOVERABLE SLEEVE OF COMPOSITE

This application is a continuation of application Ser. No. 08/271,537 filed Jul. 7, 1994 which is a continuation of Ser. No. 07/985,540 filed Dec. 4, 1992, now abandoned, which is a divisional application No. Ser. 07/552,370 filed Jul. 16, 1990, now abandoned, which is a continuation of application Ser. No. 07/296,480 filed Jan. 12, 1989, now abandoned.

This invention relates to a composite material comprising multifilament fibres, often referred to as bundles, and a matrix material, the material having improved planar tightness by which we mean an improved resistance to fluid transfer generally parallel to a surface thereof. Preferably fluid uptake and storage within the composite are reduced.

Composite materials find wide use due, for example, to the flexibility or alternatively tenacity (strength) they can possess. We have found, however, that for many uses multifilament fibres, which may be chosen as a component of a composite material for their high flexibility etc, present problems due to their ability to transmit air, water and other contaminants.

We have further found that multifilament fibres (which may provide strength and which may therefore be regarded as comprising strength fibres) can be treated or constructed to overcome such problems, thereby allowing their use where fabrics or composites had not previously been used, or where such articles had been made from mono-filament fibres. Such treatment or construction results in a multifilament fibre being blocked at one or more positions along its length, or preferably substantially continuously along its length. A block comprises some means that prevents or hinders passage of fluid longitudinally along the interstices of a multifilament fibre, and will generally comprise some polymeric filling. Spaced apart blocks may prevent or reduce fluid transfer along a fibre, but the fibre may still be capable of taking up and storing fluid. That too may be prevented or reduced by a substantially continuous block along the fibre length.

The invention provides a composite material comprising:
(a) blocked multifilament fibres; and
(b) a polymeric matrix material, preferably that renders the material substantially impervious to the passage of liquid through the thickness of the article The invention further provides a dimensionally-recoverable article comprising:
(a) multifilament fibres, at least some of which at least in the article after recovery (and preferably also before recovery) are blocked by a polymeric material and
(b) a polymeric matrix material preferably that renders the article substantially impervious to the passage of liquid through the thickness of the article.

The multi-filament fibres preferably constitute at least part of a fabric especially a woven fabric, particularly a dimensionally-recoverable fabric.

The invention also provides a composite material which comprises:
(i) a polymeric matrix material;
(ii) multi-filament fibres
(iii) hybrid fibres (preferably comprising said multifilament fibres) comprising
    (a) a strength fibre (preferably a plurality of strength fibres) and
    (b) blocking material in the form of or formed from heat-softenable fibres that on heating (and preferably also compression and/or recovery) of the composite material will block interstices of the multifilament fibres (preferably comprising interstices between the strength fibres).

The invention also provides a recoverable article comprising;
recoverable fibres exhibiting a recovery of at least 20%;
(ii) multifilament fibres; and
(iii) hybrid fibres (preferably comprising said multifilament fibres) comprising
    (a) a strength fibre (preferably a plurality of strength fibres); and
    (b) blocking material in the form of or formed from heat-softenable fibres that on heating (and preferably also compression and/or recovery) of the composite material will block interstices of the multifilament fibres (preferably comprising interstices between the strength fibres).

The invention further provides a method of making a composite material which comprises:
(i) providing, preferably in the form of a fabric, multifilament fibres and hybrid fibres (preferably comprising said multifilament fibres), the hybrid fibres comprising
    (a) a strength fibre (preferably a plurality of strength fibres) and
    (b) blocking material in the form of heat-softenable fibres that on heating (and preferably also compression) of the multifilament fibres will block interstices of the multifilament fibres (preferably comprising interstices between the strength fibres);
(ii) coating the fabric with a polymeric matrix material;
(iii) heating (and preferably also compressing) the hybrid fibres before, during or after coating to cause the heat-softenable fibres to soften and block interstices of the multifilament fibres.

Changes that can occur in a recoverable article on recovery (especially compression against an underlying substrate) or the heating step that may be used to cause recovery or other heating or pressurizing step applied to a recoverable article or composite material may cause a suitably constructed, but non-planar tight, article to become planar tight.

It may be desirable that an article or material be supplied for its final use in a blocked or planar tight condition, but that is not always necessary. Some further treatment (which may comprise treatment inherent in use or installation, such as heat-recovery as mentioned above) may result in blocking or planar tightness. Various techniques are disclosed herein, and the skilled reader will readily be able to determine whether such further treatment is necessary. For convenience, however, an article or material may be referred to as blocked or planar tight when such properties result from installation or use or other simple treatment. Suitable constructions for achieving blocking or planar tightness may comprise impregnated multifilament fibres or a coating around the fibres or a layer extending over the fibres or hybrid construction of strength fibres and some heat-softenable fibres.

As a rough guide it may be noted that impregnation may be preferred where blocking is desired before heat recovery or other installation treatment etc; and the other techiques particularly the use of hybrid fibres may be chosen where blocking is required only after installation etc.

In general, where a hybrid construction is used, we prefer a core of one or more strength fibres (which term includes metal wires) preferably having a rex value of 2–300 (preferably 5–200, more preferably 10–100, especially 10–80) surrounded by a sheath of heat-softenable fibres, the core plus sheath preferably having a tex value of 10–1000 (preferably 20–700, more preferably 30–500 especially 50–300). The impregnant or coating or the layer of the material or heat-softenable fibres may then flow or otherwise deform during recovery to provide the desired blocking. The material involved will in general have a much lower viscosity than the matrix material. The heat-softenable fibres will preferably block a multifilament core which together with the softenable fibres comprises the hybrid fibres; however blocking may additionally or alternatively be provided by other fibres, for example fibres which are woven or knitted or otherwise fabricated with the hybrid fibres, or which together with the hybrid fibres form part of a composite material. This blocking of other fibres will occur when the hybrid fibres have a core of a single fibre.

The article is preferably recoverable by virtue of recoverable fibres thereof, although it may be the matrix material that is recoverable and the multifilament fibres provided, for example, for reinforcement. Where recoverable fibres are provided they may comprise the fibres of the multifilament fibres or bundle or they may be different; and where different, the two may be interlaced to form at least part of a fabric for example a substantially uniaxially-recoverable weave or warp or weft-inserted knit. For example, a recoverable fabric could be provided having said multi-filament fibres running in one direction, and recoverable fibres (which may also be multifilament) running in a perpendicular direction. Where fibres in each direction are multifilament, the blocking material may cause both sets to be blocked.

The invention still further provides a blocked multifilament fibre, the fibre being blocked with a polymeric material such that a methylene blue solution wicks along the fibre preferably 10 cms or less in a period of 24 hours.

The polymeric blocking material may be applied by any suitable technique, for example by passing unblocked fibre through the polymeric blocking material in the form of a latex, in the melt, in solution or by means of a monomer or other precursor followed by curing. We prefer that the solution wicks less than 5 cms, especially less than 2 cms, more especially less than 1 cm in 24 hours.

The invention yet further provides a method of blocking a multifilament fibre comprising applying to the fibre a polymeric material in the form of an emulsion, particularly a latex especially a water-based latex.

Achieving proper blocking of multifilament fibres is not a trivial problem since the ability of moisture, water vapour, or other contaminants to wick along the fibre interstices over a long period of time may be expected to be greater than the ability of the blocking material to permeate the interstices during the time available for manufacture. These techniques are, however, able to produce blocked fibres generally without the further treatments mentioned above (such as recovery of a recoverable article of which they may form a part).

It is desirable for many reasons that a heat-recoverable article or composite material (especially when used for sealing a substrate such as one comprising a cable or a pipe) be substantially free from water or other contaminants or even from air. For example water may damage the substrate to be sealed or may damage the recoverable article particularly during heat-installation by vaporizing and bubbling, and air gaps may lead to electrical discharge in the case of sealing high voltage cables.

The invention therefore also provides a method of environmentally protecting a substrate (such as one comprising a cable or a pipe) which comprises installing around the substrate (preferably by heat-recovery) an article (preferably a wrap-around or other sleeve, preferably heat-recoverable) that comprises blocked multifilament fibres.

The invention also provides a method of reentering and resealing a sealed substrate (such as one comprising a cable or a pipe), said substrate being sealed with a composite material as defined above, which comprises:

(a) cutting the composite material in a direction that crosses multifilament bundles of the composite material, and partially removing the composite material, thereby exposing the substrate, and (b) resealing the substrate by positioning thereover a cover (preferably a heat-shrinkable sleeve), said cover extending across the cut in the composite material.

In addition to the use of techniques of the invention in environmental sealing, they are likely also to be of benefit in the production of structural members and pipes and other conduits etc. For example, there is a need for fibre-reinforced materials that are resistant to uptake or transmission of water or other contaminants. Thus, for example, damage due to freezing of entrapped water may be avoided.

When not applied as heat-softenable fibres, the polymeric blocking material is preferably applied to the fibres in the form of an emulsion, more preferably as a water-based latex. Alternative techniques include application in the melt, application in solution (although the removal of solvents may be a problem), or application as polymeric precursors and polymerization in situ.

In general, by blocking of a multi-filament fibre we mean a treatment that significantly reduces the ability of that fibre to transmit or hold a fluid. We prefer that the interstices between the filaments be filled with polymeric material substantially entirely along the length of any given sample, although a significant reduction in fluid transmission may be achieved by repeated spaced apart blocked segments of fibre.

By recoverability is meant the capability of an article to undergo change in dimensional configuration when subjected to appropriate treatment. Usually these articles recover to an original shape from which they have previously been deformed, but the term "recoverable", as used herein, also includes an article which adopts a new configuration, even if it has not been previously deformed, as will be the case of a recoverable fabric or composite made from a recoverable fibre.

Heat recoverable articles which are based on fabrics are described in the following patent publications and applications: U.S. Pat. No. 3,669,157 (Carolina Narrow Fabric), European Patent Application Publication Nos. 0 116 393 [corresponding U.S. Pat. Nos. 4,626,458; 4,761,193; 4,820, 561; and 5,002,822 as well as U.S. application Ser. No. 567,129, filed Dec. 30, 1983, now abandoned] (MP0790), 0 116 391 [corresponding to U.S. Pat. Nos. 4,626,458; 4,761, 193; 4,820,561; and 5,002,822] (RK169), 0 117 026 [corresponding U.S. Pat. No. 4,631,098] (RK176), 0 115 905 [corresponding U.S. Pat. No. 4,624,720] (RK177), 0 116 392 [corresponding U.S. Pat. No. 4,940,820] (RK178), 0 116 390 [corresponding U.S. Pat. No. 4,803,103] (RK179) 0 117 025 [corresponding U.S. Pat. No. 4,761,194] (RK181), 0 118 260 [corresponding U.S. Pat. No. 4,729, 920] (RK189), 0 137 648 [corresponding U.S. Pat. No. 4,576,666] (RK205), 0 153 823 [corresponding U.S. Pat. No. 4,639,545] (RK228), 0 175 554 [corresponding U.S. Pat. No. 4,668,545] (RK246), European Patent Application No. 86303767.6 [corresponding U.S. Pat. No. 4,816,326] (RK273), British Applications No. 8528966 [corresponding U.S. Pat. No. 4,900,596] (RK289), 8610813 [corresponding U.S. Ser. No. 921,570 filed Oct. 21, 1986, now abandoned] (RK296), 8529800 (B118), and U.S. patent application Ser. No. 821,662, now abandoned, (B121). The disclosures of these patents and applications are incorporated herein by reference. The manufacture of heat recoverable articles from fabrics containing heat-recoverable fibres has a number of advantages compared with conventional techniques for making heat-shrinkable products, including ease of manufacture, since no subsequent expansion step is necessary, improved mechanical properties such as tensile strength, abrasion resistance and split resistance, and the ability to introduce very high strength heat-stable fibres into the articles, all of which enable heat recoverable fabrics to be employed in fields hitherto considered inappropriate for heat-recoverable products.

The heat-shrinkable fabrics described in the prior art have many applications, for example covering, mechanically protecting, electrically screening, and environmentally sealing objects enclosed by the fabric. For many of those applications it is particularly desirable for the fabric to provide an enclosure which is impervious to the ingress of water, moisture or other liquid. An example of such an application is where the fabric is to provide an enclosure for a splice between electrical or fibre optic cables for example telecommunication or power cables. In such applications, presence of water may cause an electrical short circuit, and consequent signal distortion. In the heat-recoverable fabric materials described in the prior art, imperviousness is typically achieved by using a polymeric matrix material in conjunction with, bonded to, or extending throughout the recoverable fabric. The polymeric matrix material is typically applied as a laminate layer on one or both sides of the fabric, or as a matrix through which the fibre-extends. The current fabrics preferably have polymeric material on each side of the fabric.

Coating of the fibres with the matrix material may be carried out at such temperature and/or pressure that heat-softenable fibres where provided as a source of blocking material become softened and if necessary flow or otherwise deform to block interstices between strength fibres. Extrusion coating, optionally in conjunction with nip rolls may be used.

The lamination or impregnation of the heat recoverable fabric with polymeric material substantially prevents penetration of water, moisture or other liquids through the thickness of the article, reckoned as a direction substantially transverse to that or those in which the fabric or fibres lie. However, it should be noted that polymeric materials do have a positive, if small, moisture vapour transmission value, and that a small amount of moisture permeation does occur. For this reason the polymeric matrix material is said "substantially" to prevent liquid or vapour ingress through the thickness of the sleeve.

More significantly, water vapour, or other ingress including air into a splice case or other enclosure may occur by passage along the fibres of the composite material. Also, even if entry into the enclosure is not possible, the splice case may be able to absorb water from the atmosphere during storage. The splice case is therefore preferably supplied with fibres substantially blocked. This may occur, for example if the fibres used can themselves transmit water along their length (particularly in the case of multifilament fibres), and if the composite construction is such that a free end of a fibre is accessible to the liquid and the fibres are or become exposed to the interior of the enclosure. If the composite article is for example a tube which has an internal layer of polymeric material passage of liquid along the fibres will not in general be a problem (at least in the case of low voltage cables), since the liquid will not be able to pass into the interior of the enclosure to any significant extent, its path being blocked by the polymeric material. However if the fibres are laminated with a polymeric material only externally or if an internal laminate is damaged, water passing along the fibres may enter the enclosure. An example where such ingress may occur is in a heat-recoverable fabric sleeve containing glass fibres, where the glass extends from one end of the sleeve to the other and the fabric is laminated only on its outside surface. Water or air for example may enter the interior of the sleeve, by entering first the free end of a glass fibre (for example between the filaments of a multifiliment bundle), then migrating along the length of the fibre, from which it may then pass into the interior of the sleeve. Blocking against air may be particularly important where the final product is to be pressure resistant, an example being a telecommunications splice case for pressurized cables.

A further instance where a problem may arise is where a fabric or composite forms only part of an enclosure, such that an edge of one portion of the fabric is exposed to the environment, and an edge of another portion is exposed to the inside of the enclosure; moisture or other contaminant may travel from the outside to the inside of the enclosure by travelling along the thickness of the fabric, entering an edge at the first portion and leaving at an edge at the second portion. A particular instance of this problem is where a cable splice case (or other enclosure) is re-entered and resealed as follows. A central portion of a splice case is removed by making two circumferential cuts through it, one at each end of the splice, the cuts crossing multifilament fibres of the splice case. This leaves an end portion of the old splice case left in position on the spliced cables at each end of the splice, but exposes the splice itself allowing work to be carried out on the conductors. It is desirable that the old end portions be left in position because it can be difficult making a seal to the cables, particularly around branching cables, and once a seal is made it is better not disturbed. Resealing is achieved by, for example, shrinking a shrinkable sleeve, or otherwise installing a cover, over the old end portions, the new sleeve being long enough to bridge-the splice and to overlap each old end portion by a few centimetres and therefore extend across the cuts in the composite material. The new sleeve will not in general form a seal directly to the cables emerging from the old end portions, for the reason given above. It can be seen that a route for entry of moisture into the reconstructed splice case exists along generally axially arranged fibres in the old end portions: one edge portion of each old end portion is exposed to the environment and another lies under the new sleeve, within the reconstructed splice case.

We therefore propose the present new construction of fibre-based article which substantially prevents passage of liquid through the thickness of the article, and also substantially prevents liquid or vapour travelling along fibres of the fabric. This is achieved by providing a fabric or composite which has a substantially continuous blocking of those fibres along which liquid may migrate, the blocking being preferably by means of a polymeric material preferably supplied in conjunction with those or other fibres. In the case of a composite, the article may also comprise a second polymeric material applied to the fibres, to render them substantially impervious to the passage of liquid perpendicular to the plane in which they lie. The fibres will conveniently be provided in the form of a fabric, particularly a woven or knitted fabric.

As used herein, the unqualified term "fibres" includes monofilaments as well as multifilament fibre bundles, and in some articles at least heat-shrinkable fibres, for example, will be in the form of monofilaments. The term includes tapes, including profiled tapes, embossed tapes and fibrillated tapes.

In one preferred embodiment the fabric or composite cover and hence the article is in the shape of a sleeve (which term includes wraparound and tubular sleeves). In this case passage of liquid into the interior of the sleeve either through the thickness of the article or from either end of the tubular article is substantially prevented, even if the sleeve is cut. Preferred forms of the heat recoverable fibres are described in the British and European patent applications mentioned above. The heat-recoverable fibres are preferably formed from a polymeric material that imparts good physical properties for example good creep-resistance to the fibres. Olefin polymers such as polyethylene (especially high-density polyethylene) and ethylene copolymers, polyamides, polyesters, and acrylic polymers capable of being cross-linked may be employed. A preferred polymeric material for the fibres is based on polyethylene having a density of 0.94 to 0.979 g/cc, and Mw of from $80\times10^3$ to $200\times10^3$ and an Mn of from $15\times10^3$ to $30\times10^3$.

The heat recoverable fibres preferably have a minimum recovery stress of $10^{-1}$ MPa, more preferably $5\times10^{-1}$ and usually at least 1 MPa at a temperature above the transition temperature of the fibres. There is in theory no upper limit of recovery stress, but in practice 200 MPa and more usually 100 MPa is the highest figure normally achievable with polymeric fibres. The tensile strength of the fibres at their recovery temperature is preferably increased to 0.1 MPa or higher by cross-linking the polymeric material from which they are formed, either by chemical means or by irradiation e.g. high energy electron irradiation, gamma radiation or by ultra violet radiation.

When the fibres are cross-linked by irradiation this may be done at any suitable stage. As one example the cross-linking step can be incorporated into manufacture of the fibre. The fibre can be extruded, stretched at a temperature below its melting temperature, preferably by an amount of from 400 to 2000%, then subjected to irradiation to effect cross-linking. Alternatively, the fibre can be extruded, irradiated to cross-link, heated, stretched and then cooled. High density polyethylene fibres are preferably irradiated with a dose of from about 5 to about 35 megarads, preferably from about 5 to about 25 megarads, and in particular from about 8 to about 10 megarads. Usually the gel content of the cross-linked fibre is greater than 20%, preferably greater than 30%, most preferably greater than 40%. In practice, gel contents greater than 90% are not easily achievable. As another example the fibre can be extruded, stretched at a temperature below its melting point, incorporated into a fabric and then irradiated.

Although it is usually preferred for the heat-recoverable fibres to exhibit a recovery of at least 20%, and especially at least 40%, higher values may be desirable in order that a fabric or composite material formed from the fibres have a sufficiently high recovery. For many uses, for example uses as a splice case or other article for environmental sealing, it may be desirable that the composite material have a recovery of at least 45%, especially at least 60%. In certain instances however for high pressure retention capability, it may be desirable to employ heat-recoverable fibres of relatively low recovery ratio, e.g. as low as 5% recovery.

The multifilament fibres, are preferably heat-stable although they may be heat-recoverable, and will in general impart some strength and as a result at least a component thereof may be referred to as stregth fibres. They preferably have a tenacity of at least 0.03 Newton per Tex at 120° C. preferably also at 180° C. and more preferably of at least 0.07 particularly at least 0.1 especially at least 1.0 Newton. Their strength may be compared with that of the heat-softenable fibres that are used to provide blocking. By a heat-stable article is meant an article which, unlike a heat-recoverable article, does not change its configuration when heated, until it changes phase. The fibres may be present as at least part of a fabric such as a woven, knitted, braided, or non-woven fabric. Preferably the fabric is one, preferably a weave, in which heat-recoverable fibres extend in one direction and dimensionally heat-stable fibres in another direction (preferably substantially perpendicular to the first) so that the fabric as a whole is recoverable in a single direction only. Where the fabric comprises a weave, we prefer that the weft be recoverable, but the directions may be reversed. The fabric may, however be entirely heat-stable, for example in the form of a glass fibre mat, or a woven or knitted glass fibre structure.

Thus for example a novel non-recoverable multifilament glass or other fibre fabric may be provided that is blocked in one or more directions.

Such a fabric may be used for mechanical or thermal protection, and it may form part of, or be used with, a heat-shrinkable product such as a wrap-around or tubular sleeve for use as, for example, a cable splice case.

For example a dimensionally-recoverable sleeve may have such a blocked glass fabric on a surface thereof, preferably on an external surface to provide protection against a gas torch.

For many applications where the article is in the shape of a sleeve it is desirable for a first set of heat-recoverable fibres to extend around the circumference of the article, and a second set of heat-stable fibres to extend along the length of the article. This means that the article will be radially recoverable, but will not change significantly in length when recovered. Preferably the heat-stable fibres extending along the length of the article have high axial strength, and thereby impart good axial strength to the finished article.

The fibres of the second set are blocked with a polymeric material. As examples of materials that may be used for the fibres there may be mentioned glass, synthetic polymeric materials, for example, polyether ketones, Ryton (trade mark), Nomex (trade mark), polyarimids such as Kevlar (trade mark), cross-linked polyolefins, and natural fibres, for example cotton, polytetrafluoroethylene, polyimides, fluoroolefins, pyrollized polyacrylonitrile or metal. Other fibres that may be used include carbon fibres and silica staple fibres.

The polymeric blocking of the second set of fibres substantially prevents any liquid migrating along interstices between the fibres. In the case of a sleeve, therefore, liquid is prevented from entering the interior. The blocking should be of sufficient strength and thickness to prevent leakage of any migrating liquid through the coating and also to prevent damage to the coating, particularly any damage which would expose the underlying fibres themselves. The blocking material is preferably flexible, to enable the fibres to be easily fabricated into a fabric. The blocking material is preferably also sufficiently strong and tough to prevent it being damaged during manufacture or installation of the article. This is particularly important when only a single laminate layer is used, and the blocked fibres are otherwise exposed.

Preferred blocking materials include hot-melt adhesives such as ethylene vinyl acetate, resins that can be delivered as a latex or in solution, and acrylic or other resins that can be cured thermally or by u.v. Other blocking materials include polyethylene, polypropylene, polyvinyl chloride polyvinylidene chloride and esters such as polyethylene terephthalate and nylon such as nylon-6, and these materials are preferred when the material is supplied as heat-softenable fibres.

The blocking material may be applied to the fibre bundles before they are woven or otherwise formed into a fabric, and such application may but need not result in properly blocked fibres; it is possible for subsequent manufacturing steps, such as lamination or heating, or subsequent installation such as heat-recovery to cause the blocking material to flow and achieve the desired block. Another possibility is for a non-blocked fibre to be formed into a fabric, the fabric to be laminated or otherwise coated with a suitable material for example in sheet form or by spraying or dipping and then to be further laminated with a further material that will form a matrix for the fabric rendering it impervious. The first material to be applied may be of low viscosity when heated and later serve to provide blocking.

Particularly where the blocking material is supplied as heat-softenable fibres, we prefer that:

(a) the matrix material has a softening temperature from 60°–180° C., preferably 70°–160° C., more preferably 85°–140° C.;

(b) the heat-recoverable fibres have a recovery temperature of from 80°–80° C., preferably 90°–160° C., more preferably 100°–150° C.; and (c) the blocking material has a softening temperature of 300° C. or less, preferably 250° C. or less, more preferably 200° C. or less.

Preferably the recovery temperature is from 150° C. (more preferably 100° C.) below to 50° C. (more preferably 25° C.) above the softening temperature of the heat-softenable fibres.

Preferably the softening temperature of the matrix material is from 180° C. (more preferably 60° C.) below to 100° C. (more preferably 20° C.) above the softening temperature of the blocking material.

The fabric can be woven in a pattern, for example, twill, satin, sateen, leno, plain, hop sack, sack, matt and various weave combinations in single or multiple ply weaves e.g. 2- or 3- ply weaves. Weaves, knits and braids can be used, although weaves and knits are most preferred. For some applications, particularly where good abrasion resistance of the article is desired, it is preferred to use a twill design.

As mentioned above, the article according to the invention may include a polymeric matrix material which is applied to the sets of fibres to render them substantially impervious to the passage of liquid perpendicular to the plane in which they lie. In another embodiment, the fibres are present to reinforce or protect the polymeric matrix material, which may be recoverable for example in the form of a recoverable sleeve. The matrix polymeric material may be either in the form of a layer or layers applied to one or both surfaces of the set of fibres or of the fabric, or may be in the form of a matrix through which the fibres extend. The polymeric matrix material is preferably bonded to the fibres, thus preventing passage of fluid along the outer surfaces of the fibres between the fibres and the matrix material. It is also desirable that the fibres and the polymeric material be reasonably flexible to prevent cracking or delamination during use.

The use of a single laminate layer of polymeric material substantially only on one side of the fabric may be chosen in some circumstances. For example the overall article would then be lower in weight. Also a fabric article laminated on only one side has been found to be capable of achieving higher recovery ratios than an equivalent fabric which is laminated on both sides or impregnated with a matrix. Without limiting the invention in any way, this is thought to be because when there is a double laminate layer or an impregnated matrix, the polymeric material tends to block the interstices of the fabric and thereby hinder recovery. Preferred embodiments of the article according to the invention have a recovery ratio in the range 1.1:1 to 8:1, especially 2:1 to 8:1.

Preferably the polymeric matrix material (which may be referred to as the second polymeric material where necessary to distinguish it from the polymeric blocking material) is one which has an elongation/temperature profile such that there exists a temperature (t) which is at or above the recovery temperature of the fibres (and preferably above the crystalline melt temperature) at which the second polymeric material has an elongation to break of greater than 20% and a 20% preferably also a 2% secant modulus (X) of at least $10^{-2}$ MPa (measured at a strain rate of 300% per minute), and at which temperature the inequality (1) is satisfied:

$$\frac{X}{Y} \frac{(1-R)}{R} \text{ is less than one, preferably less than 5, especially less than 10} \quad (1)$$

wherein Y is the recovery stress of the fibres (preferably at least $5\times10^{-2}$ MPa) at a temperature above their recovery temperature, (and preferably above the crystalline melt temperature of the material of the fibres), and R is the mean effective volume fraction of heat-recoverable fibres in the composite structure along the or each direction of recovery based on the total volume of heat-recoverable fibres and the second polymeric material. A suitable material for the second polymeric material is described in European Patent Publication No. 0116393 (MP790) the disclosure of which is incorporated herein by reference.

The fibres on recovery cause deformation of the matrix material, and that deformation is preferably by flow (as opposed to mere bending). The matrix preferably thickens as its surface area is decreased by the recovering fibres.

At or above the recovery temperature of the fibres the second polymeric material is preferably capable of limited flow under pressure. It preferably has, at the aforesaid temperature, an elongation to break of greater than 50%, most preferably greater than 100%, and a 20% preferably also a 2% secant modulus of preferably at least $5\times10^{-2}$ MPa, most preferably at least $10^{-1}$ MPa, measured at a strain rate of 300% per minute.

The ability of the second polymeric material to flow when heated need not necessarily apply after recovery. Thus, for example, the second polymeric material may eventually cure to a thermoset on heating, although it is preferred that the cure rate under recovery conditions is such that recovery is not hindered and the material does not drip off the fabric during the recovery. Thus, for example, the second polymeric material may contain grafted hydrolysable silane groups which are capable of cross-linking the material subsequently in the presence of moisture. Examples of such materials are given in U.S. Pat. No. 1,286,460 to Dow Corning Ltd., the disclosure of which is incorporated herein by reference. Alternatively the second polymeric material may include a polymer, preferably a rubber for example an acrylic rubber, which contains epoxy groups and a room temperature insoluble curing agent e.g. dicyandiamide. In general, however, we prefer that the matrix material comprises a polyolefin such as polyethylene, particularly low-density polyethylene. The matrix material is preferably cross-linked.

The second polymeric material may be chemically and/or physically compatible with the polymeric material used for blocking of the fibres. Compatibility is also possible between the second polymeric material and the heat-recoverable fibres. Furthermore, there may be compatibility between the second polymeric material applied to the fabric, the polymeric material of the heat-recoverable fibres and the polymeric blocking material of the multifilament fibres. Compatibility of polymers may arise through the polymers being of similar or identical chemical types and their relevant physical properties during lamination installation and use be similar or identical, but this is not essential.

It is desirable to have good compatibility when only a single laminate layer is used, otherwise there may be disbonding between it and the fibres. When a double laminate layer is used, one on either side of the fabric, the polymeric layers may bond to each other through the interstices of the fabric and it is less important that there be good compatibility, although it is still desirable.

When the second polymeric material is applied to the fibre as a laminate layer, the compatibility between (a) the second polymeric material and (b) the blocking material and/or the recoverable fibres is preferably such that the adhesive peel strength between the laminate layer and the fibres is at least 10N/25 mm width measured at 23° C., to prevent disbonding of the laminate layer from the fibres.

Since the blocking material can be selected to be compatible with the heat-recoverable fibres and with the second polymeric material a very tight structure may be achieved in the absence of a direct bond between the multifilament fibres and the second polymeric material. Thus, a wide range of combinations of materials can be used.

Examples of materials that can be used for the second polymeric material and also for the polymeric blocking material include thermoplastic and elastomeric materials. Examples of suitable thermoplastic materials include ethylene/vinyl acetate copolymers, ethylene/ethyl acrylate copolymers, ethylene butyl acrylate copolymers, polyethylenes including linear low, low density and high density grades, polypropylene, polybutylene, polyesters, polyamides, polyetheramides, perfluoroethylene/ethylene copolymer and polyvinylidene fluoride. Examples of elastomeric materials include styrene butadiene copolymers and functional analogues thereof, acrylonitrile butadiene styrene block co-polymer, acrylic elastomers including the acrylates and methacrylates and their copolymers, e.g. polybutyl acrylate, and poly 2-ethylhexyl acrylate, the high vinyl acetate copolymers with ethylene (VAE's), polynorbornene, polyurethanes and silicone elastomers and the like. Where appropriate, these materials may be used as the blocking material and applied in solution, in the melt, as a U.V. or otherwise curable resin or, as is preferred, as a latex. For use as a blocking material an initially low viscosity (for example through solution, suspension, high temperature) has to be provided during manufacture, together with good thermal stability at the installation temperature of the product which may be high in the case of torch installed heat-recoverable sleeves. Cross-linking by iradiation etc after impregnation may help one to get this combination of properties.

The second polymeric material, and also the blocking material can be irradiated or treated by other means such as chemical cross-linking agents, for example, a peroxide cross-linking agent. Cross-linking may be desirable if the ununcrosslinked matrix material has too low a melting point. Where the blocking material is supplied as heat-softenable fibres and some flow or other deformation is required it may be desirable that a material (such a polypropylene) be chosen that does not cross-link (which includes materials where the rate of chain scission exceeds the rate of any cross-linking). In this way, the composite material can be irradiated to cross-link recoverable fibres and/or matrix thereof without imparing the ability of the blocking material to flow to form a subsequent block. In fact, irradiation may improve the flow or other properties (for example increase the melt-flow index) of polymeric materials for blocking, for example polypropylene. This may occur through chain scission or other degradation. The blocking material may, therefore, comprise one that degrades under irradiation or is a degradation product of such a material.

Thus an irradiation step may serve to improve the properties of the blocking material (by degradation) and simultaneously to improve the strength or recoverability of the fabrics and/or reduce flow of the matrix material (by cross-linking). Where irradiation is used a dose of 13 megarads or less, preferably 10 megarads or less, in particular from 2–7 megarads, is preferred for a material containing no antirads or prorads. (Higher or lower doses are preferred for materials containing antirads or prorads respectively.) The resulting extent of cross-linking allows the second polymeric material to recover with the fabric. It also prevents the second polymeric material, and the blocking material running or dripping during heat-recovery, especially during heat-recovery by means of a torch. The recovery ratio of the article after irradiation is preferably at least 50% especially at least 70% of that before irradiation. These dose values may be regarded as typical for olefinic polymers such as polyethylene and the skilled man will be able to select suitable dose values depending on the presence of various concentrations of prorads if any. The article may be produced using a single irradiation step if the beam responses of all the polymeric materials present are compatible; the beam response of the heat-recoverable fibres may, if desired, be increased by the addition of prorads and that of the second polymeric material and/or blocking material reduced by the addition of antirads. Otherwise separate cross-linking steps can be used. One method of making the article comprises extruding and stretching the heat-recoverable fibres, weaving those fibres with the blocked fibres, applying the second polymeric material, optionally by applying a single laminate layer of a material containing antirads, and cross-linking the laminated article to an irradiation dose of about 12 Mrads. A further feature of post-lamination cross-linking (particularly by irradiation) is that a cross-link bond may be formed between the recoverable fibres and/or any other fibres and/or the second polymeric material which can help to maintain the structure of the article, particularly under severe recovery conditions. This may allow a much less severe laminating process since it can obviate the need for physical interlocking.

The polymeric materials used may be non-conductive, having for example a resistivity greater than $10^{10}$, more preferably greater than $10^{14}$ ohm.cm. An electrically-heatable for example electrically heat-recoverable product may be made by incorporating materials of lower resistivity.

The heat-recoverable article according to the invention has a wide variety of uses. For example it may be recovered over substrates, especially substrates having varying or discontinuous contours, to provide mechanical protection or protection from the environment. The fabric may employ heat-stable fibres having high tensile strengths, e.g. glass fibres, or aramid fibres (such as those sold by Dupont under the tradename "Kevlar") which, if laid in the axial direction enable the article to be used for example as a pipe coupling, the high strength heat-stable fibres providing the article with a high axial pull strength.

Depending on the application of the article, it can take any suitable shape. For example it may have a uniform cross-section along its length, or the shape and/or size of the cross-section may change along its length.

For some applications it is preferred to coat the article internally with an adhesive, preferably a heat-activatable adhesive, preferably a hot-melt adhesive.

BRIEF DESCRIPTION OF DRAWINGS

Embodiments of the present invention will now be described, by way of example, with reference to the accompanying drawings, wherein:

FIGS. 1 and 2 show a tubular article 1 which comprises a fabric layer 3 and a matrix 5 of low density polyethylene. The fabric layer 3 may for example comprise 2×2 twill weave comprising a weft of heat-shrinkable high density polyethylene fibres 7 extending around the circumference of the article and a warp of heat-stable fibres 9 extending along the length of the article. The heat-stable fibres 9 comprise multifilament glass bundles blocked with an ethylene vinyl acetate copolymer.

This is shown in more detail in the inset; multifilament fibre 10, comprising filaments 11, can be seen to be blocked by polymeric material 12.

Figure 3A:
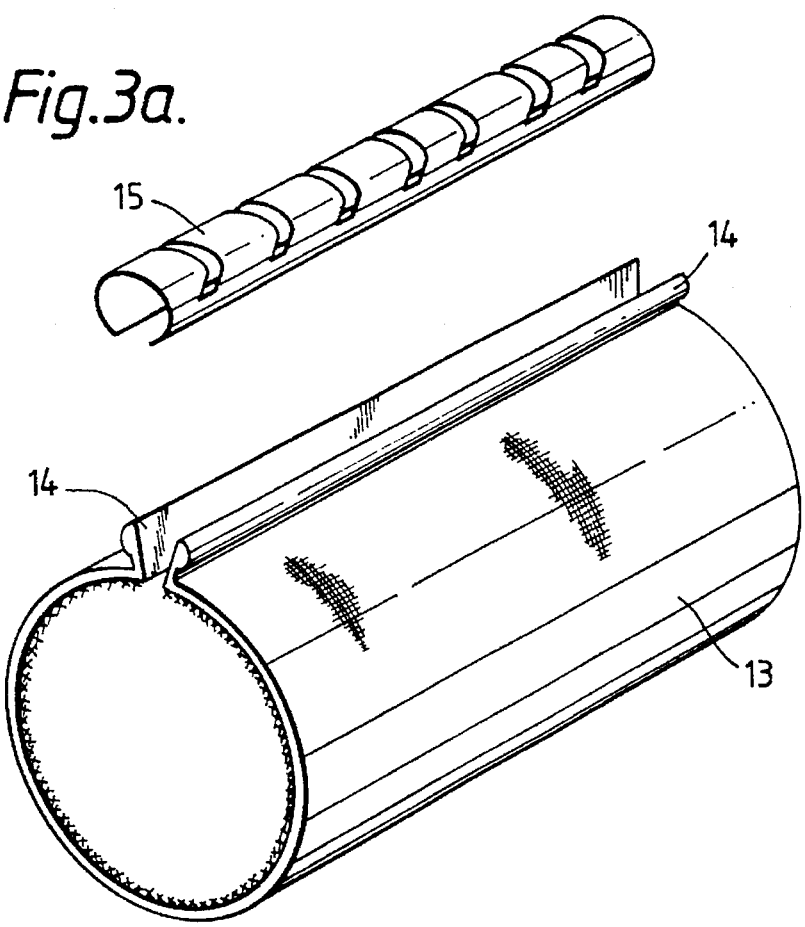
FIGS. 3a and 3b show a wrap-around sleeve.
Figure 3B:
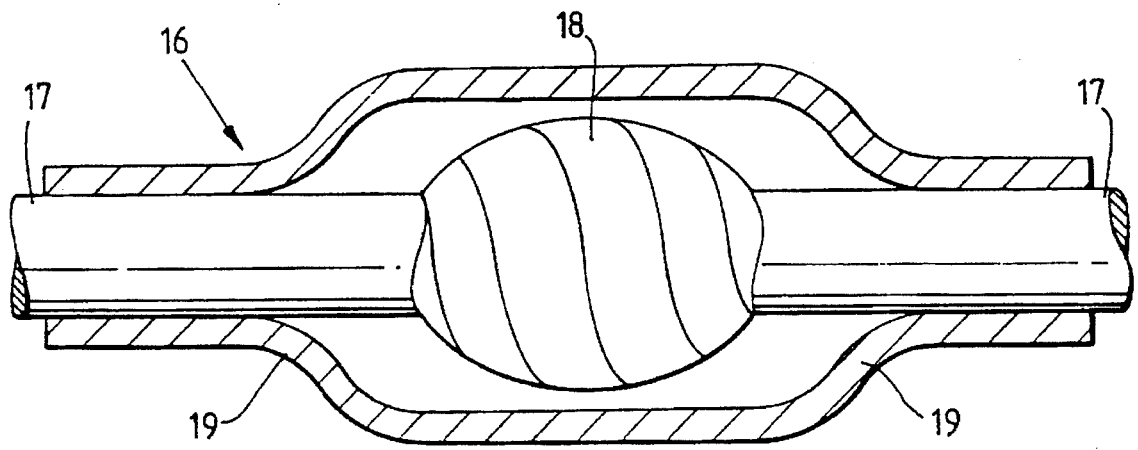

FIG. 3a shows a wraparound sleeve that may comprise a fabric or composite embodying the invention. The sleeve has closure means 14 (for example in the form of upstanding rails 14 as illustrated), that may be held together for example by a channel 15. An internal adhesive coating is represented by crosses. FIG. 3b shows the sleeve after recovery.

Figure 4A:
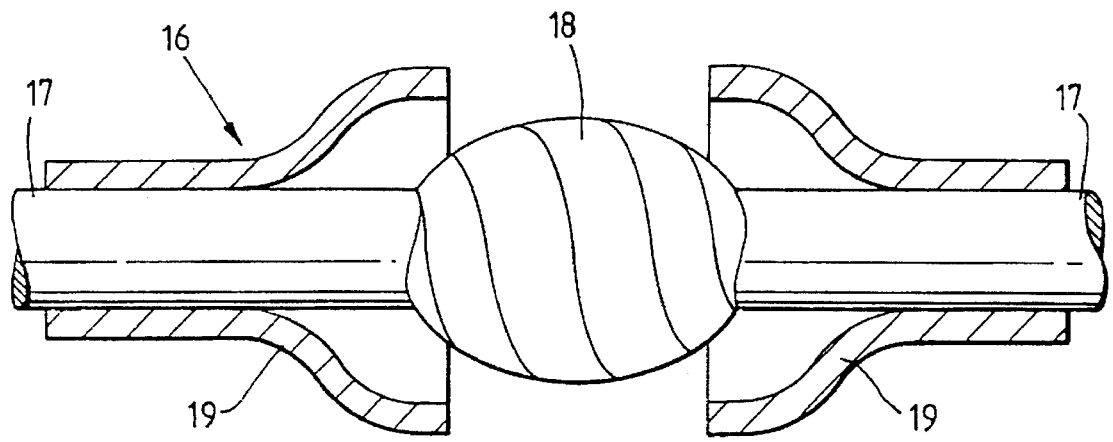
FIGS. 4a and 4b show a sleeve, partially cut-away for reentry prior to and after resealing.

FIG. 4a shows a splice case comprising a sleeve 16 heat-shrunk around a splice 18 between two telecommunications cables 17, a centre portion having been removed for repair or modification to the splice. End portions 19 can be seen to be left on the cables.

Figure 4B:
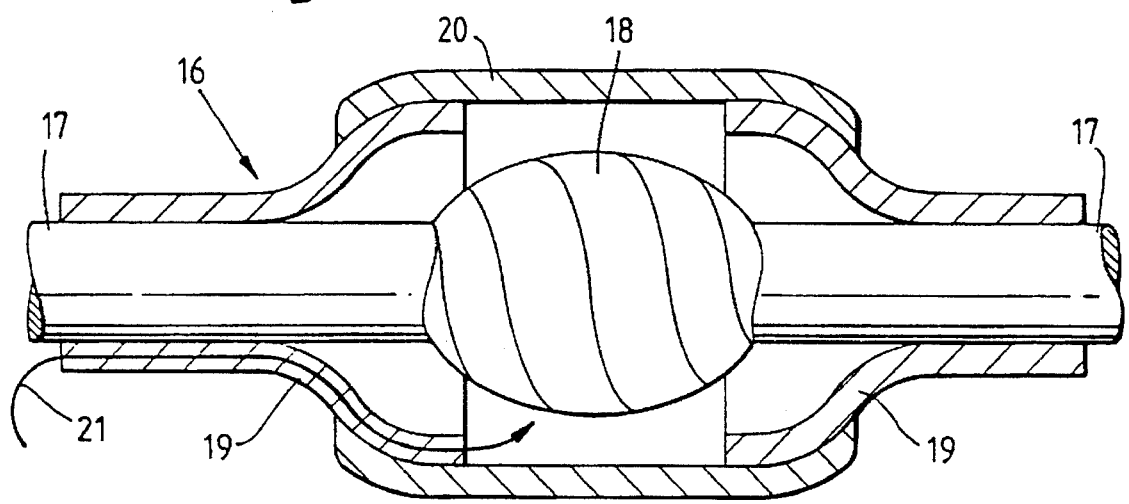

FIG. 4b shows the re-entered sleeve of FIG. 4a resealed by means of an additional sleeve 20 shrunk over the end portions 19 of the old sleeve. In general, a liner may be provided underneath the original sleeve to act as a support to prevent the hot, shrinking sleeve damaging the cable splice 18. It has been omitted from the drawings for clarity.

A leak-path along a longitudinal, generally heat stable fibre in the original sleeve is shown as 21 in FIG. 4b. It can be seen to extend from the outside to the inside of the splice case. Thus if the longitudinal fibres comprised unblocked multifilament fibres, contaminants would be able to enter the splice case by wicking along such fibres between the filaments thereof. That is prevented by the fibre blocking according to the invention. The invention may additionally or alternatively be used to block circumferentially-extending multifilament recoverable fibres.

Figure 1:
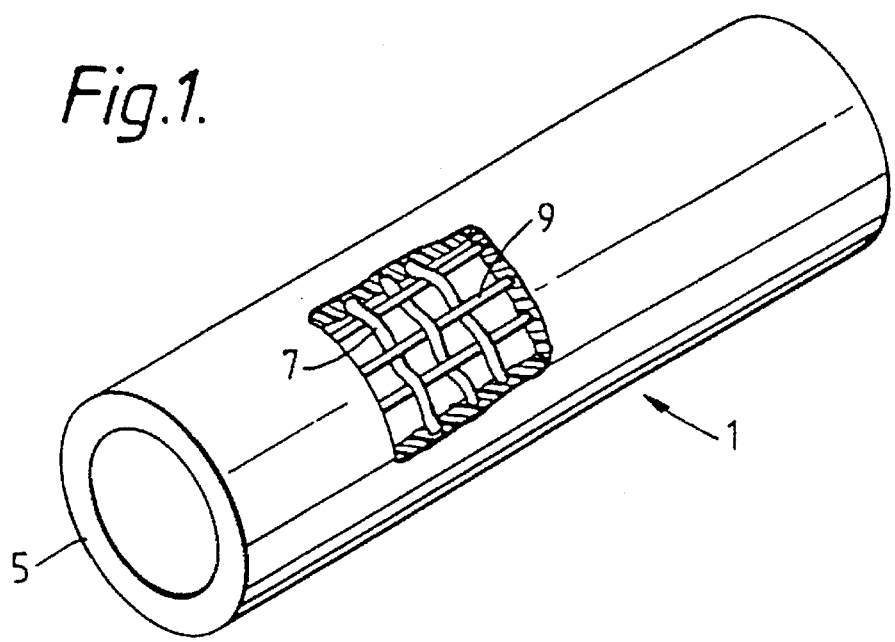
FIG. 1 is a perspective view of a radially heat-shrinkable sleeve comprising a composite material a portion of matrix material being cut away to reveal internal fibres.
Figure 2A:
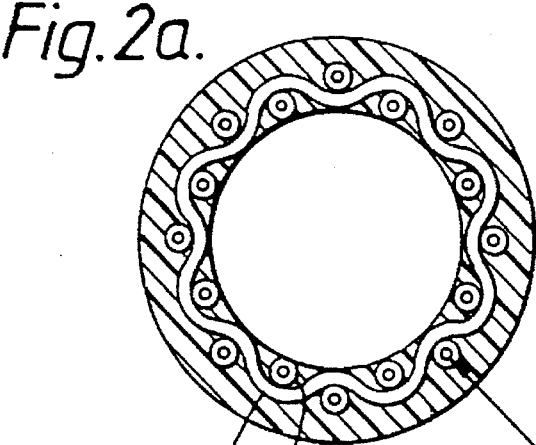
FIG. 2 is a cross-section through the article of FIG. 1.
Figure 2B:
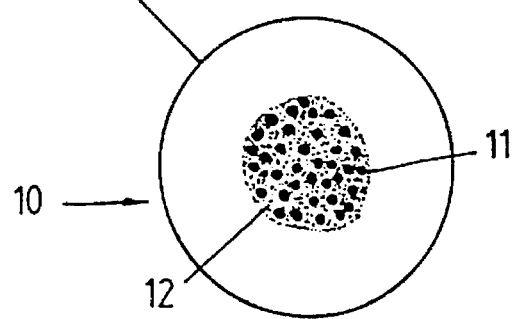

FIGS. 5-11 illustrate various forms of hybrid fibres that may incorporate recoverable fibres, may be woven, knitted or otherwise fabricated into fabric, or may be combined with a polymeric matrix material to form a composite and/or recoverable material. Such a multi-layer material may, particularly after heating, irradiation, pressurisation and/or recovery be planar tight and be useful for providing environmental protection around substrates such as those comprising cables or pipes. After such heat, irradiation, recovery and/or pressurization, the multi-filament bundles shown will, in general, have the structure of fibre 10 of FIG. 2.

Figure 5:
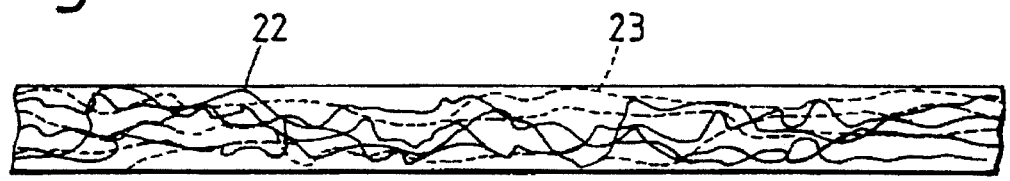
FIGS. 5-11 illustrate various forms of multifilament hybrid fibres comprising strength fibres and heat-softenable fibres.

FIG. 5 illustrates a multifilament fibre comprising continuous strength fibres 22 and continuous heat-softenable fibres 23 (shown dotted). The multifilament fibre may be produced by co-mingling its components. The number of filaments shown is less than that preferred. By "continuous" we simply mean not staple fibre and do not imply any length compared to the length of the bundle or to any fabric or composite; nonetheless, we prefer fibres to be substantially as long as the bundles, and the bundles to be substantially as long as the relevant dimension of the fabric or composite.

Figure 6:
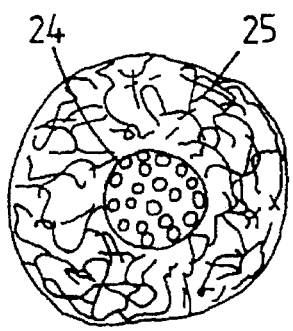

FIG. 6 shows in a transverse cross-section a core-spun multifilament fibre, comprising a core of strength fibres 24 surrounded by a sheath of stable heat-softenable fibres 25. The core may comprise a single, rather than a plurality, of strength fibres. Such core-spun fibres may be made by the Dref technique. "Dref" is a trademark of Fehrer AG of Austria. We prefer that the core have a tex value of 2–300 preferably 15 to 30, more preferably about 22, and that the core plus sheath have a rex value of 10–1000 preferably 75 to 150; more preferably about 100. Preferably the core comprises glass and the sheath comprises short polypropylene staple fibres. We have woven such core-spun fibres together with heat-shrinkable high density polyethylene fibres and laminated the result with a low density polyethylene matrix material. The core-spun fibres are preferably treated before processing such as weaving or passage through nip rolls or other equipment, in order to reduce their hairiness or stickiness. Such treatment may comprise heating. This may apply to other hybrid fibres referred to herein. The resulting composite material was heat-shrunk by 5%, and then tested for planar tightness, ie for its ability to resist fluid passage along the glass core. It was found to be able to resist fluid pressures of at least 80 psi for at least 15 minutes. This test may be regarded as demonstrating excellent planar tightness for use of the composite in the field of cable accessories and environmental protection in general.

Planar tightness may in general be achieved without the initial 5% recovery provided sufficient heat, irradiation and/or pressure is applied to soften and/or deform the polypropylene or other blocking material provided as the heat-softenable fibres. The extent of softening or deformation required will of course depend on the nature (for example size and number of filaments) of the strength fibres and on the use to which the composite material is to be put.

Figure 7:
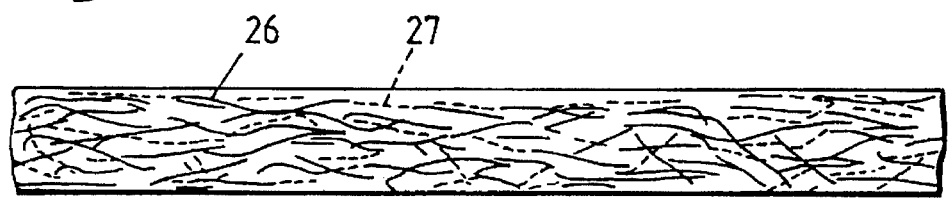

FIG. 7 shows a multifilament fibre bundle comprising a hybrid of staple strength fibres 26 and staple heat-softenable fibres 27 (shown dotted). It is preferred that the strength fibres can transmit tension over a distance greater than their own length, and they are preferably intermingled with one another and not merely interconnected by the heat-softenable fibres. Thus, the strength fibres preferably constitute the greater part of the bundle.

Figure 8:
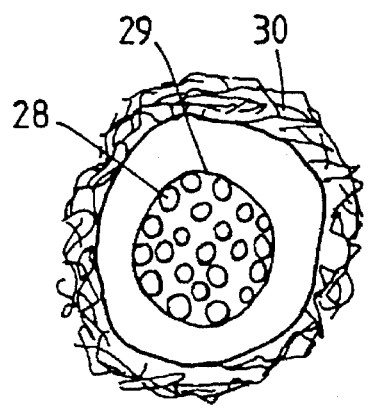

FIG. 8 shows in transverse cross-section a multifilament fibre bundle comprising continuous strength fibres 28 surrounded by a polymer sheath 29 to the outside of which are adhered staple heat-softenable fibres 30. A process for making such hybrid fibres comprises Bobtex (Trademark) integrated composite spinning. The polymer sheath may comprise the same or a similar material to that of the heat-softenable fibres.

Figure 9:
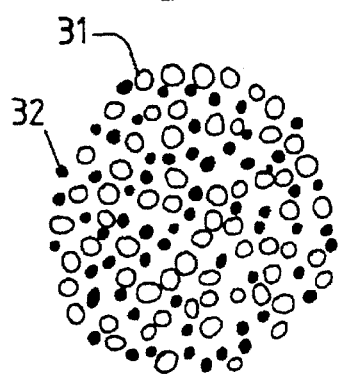

FIG. 9 shows in transverse cross-section a multifilament fibre bundle comprising continuous strength fibres 31 and continuous heat-softenable fibres 32 running substantially, mutually parallel. The strength fibres preferably comprise glass having a diameter of 3–30 microns preferably 6–12 microns and the softenable fibres preferably comprise polyethylene, polypropylene or nylon 6 having a diameter of 5–15 microns. The bundle may be provided with some twist. One or more bundles of strength fibres may be twisted with one or more bundles of heat-softenable fibres, but we prefer that the heat-softenable fibres be separated out throughout the strength fibres. Techniques such as ring twisting, 2 for 1 twisting, REPCO (trademark) self-twist spinning and flyer doubling may be used.

Figure 10:
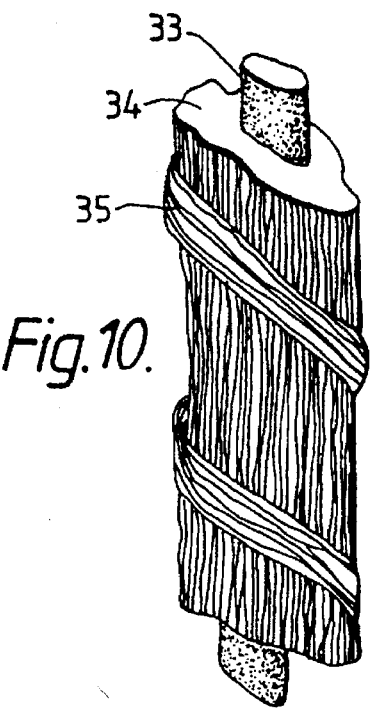

FIG. 10 shows a multifilament fibre bundle formed by a method that comprises wrap spinning (also known as hollow spindle spinning) a core 33 comprising continuous strength fibres and an outer coating 34 comprising heat-softenable fibres, which may be held around the core by a wrap or binder 35. The heat-softenable fibres may comprise staple or continuous fibres.

Figure 11:
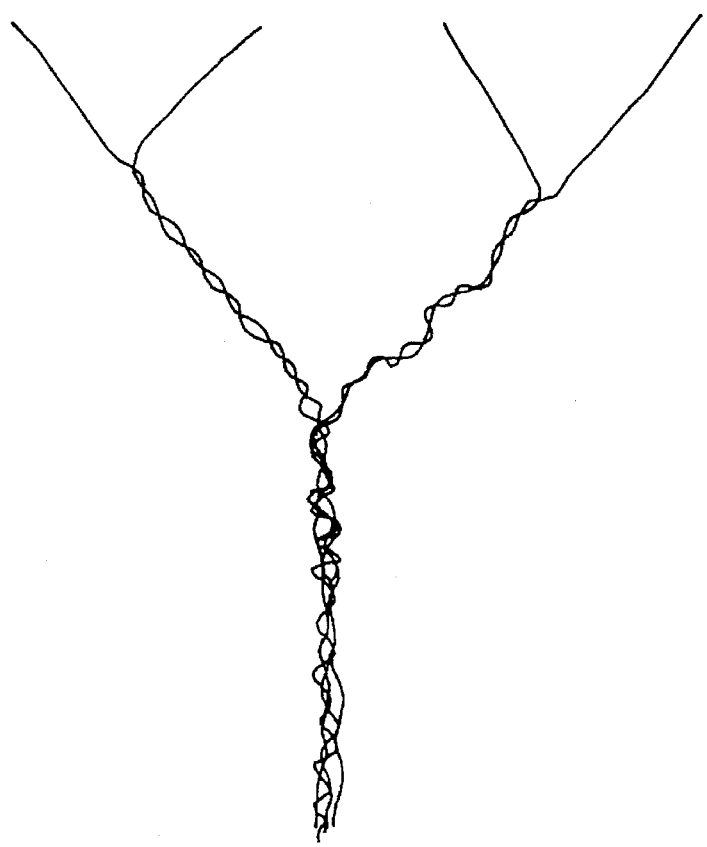

FIG. 11 shows a multifilament cable bundle being made from four continuous fibres by cabling.

As mentioned above, it may be advantageous to subject such hybrid fibres to a preliminary heat-treatment before processing such as weaving (or other fabrication) or lamination etc. Such heat-treated fibres may be easier to process. In the case of twisted hybrid fibres this may be due to consolidation or a reduction in the springyness or liveliness of the twist, and in the case of core-spun fibres a reduction in hairiness may be achieved and the fibres may run through machinery more easily, especially without sticking.

The following are specific examples of articles according to the invention. In each case the article is in the form of a uniform sleeve having a diameter of 30 mm before recovery, although sleeves of other sizes, and other articles may of course be made.

EXAMPLE 1

A 40 Tex pyrollised polyacrylonitrile yarn is twisted with two ends of 30 Tex low melting point monofilament e.g. polycaprolactone. The resultant twisted yarn had a linear density of 110 Tex. The polycaprolactone melts at 55 degrees centigrade.

EXAMPLE 2

A 22 Tex glass fibre yarn is embedded within a sheath of polypropylene staple fibre using core yarn production techniques such as those associated with core spinning as an example. The resultant yarn had a linear density of 50 Tex. The polypropylene melts at 160 degrees centigrade.

EXAMPLE 3

A 167 Tex Kevlar (TM) paraaramid yarn is wrap-spun within a sheath of polyethylene terephthalate staple fibre using a wrapping yarn of 17 Tex continuous multi-filament polyethylene terephthalate yarn. The resultant yarn had a linear density of 380 Tex. The polyethylene terephthalate component of the yarn melts at 260 degrees centigrade.

EXAMPLE 4

68 Tex glass multifilament fibres were impregnated with various water-based latices as indicated below by drawing them through a bath of latex and removing excess latex. Water was removed by forced air drying. The latex impregnated glass in each case was wound onto a spool and later used for example to make a composite material, such as a heat-recoverable composite.

Latex Type
1. Ethylene Vinyl acetate copolymer
2. Ethylene vinyl acetate/butyl acrylate terpolymer
3. Chlorosulphonated polyethylene
4. Carboxylated styrene butadiene copolymer

EXAMPLE 5

34 Tex multifilament glass fibre which had previously been impregnated from the melt with ethylene vinylacetate copolymer (28% vinylacetate) was used as described to make fabric for use in composite constructions for example a heat-recoverable composite construction.

EXAMPLE 6

68 Tex multifilament glass fibre was impregnated with a liquid composition containing a polymeric precursor which was polymerized in situ, with the aid of U.V. radiation, to give a solid polymeric impregnant. Impregnated glass was used to make fabric for use in composite constructions such as heat-recoverable composite constructions.

EXAMPLE 7

68 Tex multifilament glass fibre was impregnated with a solution of ethylene ethyacrylate copolymer (25% ethyl acrylate) in toluene at 80° C., the excess solvent being driven off by forced air drying. The resulting blocked glass was wound onto a spool for subsequent use, for example the production of fabric for inclusion in a glass-based composite.

EXAMPLE 8

The hybrid fibres of examples 1–3 were woven and the resulting weave was laminated with a layer of low density polyethylene, and the resulting composite was hot-compressed to simulate the conditions that a recoverable composite comprising such fibres would experience on installation.

200 mm length of the resulting composites with the glass fibres vertical and the lower edge freshly cut were dipped to a depth of 10 mm in an aqueous solution of methylene blue. After 24 hours at room temperature lengths of glass were checked to determine distance of travel of the methylene blue solution along the glass (wicking). The following table notes the distances measured.

| Glass unimpregnated (comparison) | 33 mm |
| Examples 1 to 3 | minimal |

EXAMPLE 9

The hybrid fibres of examples 4–7 were woven and the resulting fabric was laminated. 200 mm of the resulting composites with the glass fibre vertical and the lower edge freshly cut were dipped to a depth of 10 mm in an aqueous solution of methylene blue. After 24 hours at room temperature lengths of glass were checked to determined distance of travel of the methylene blue solution along the glass (wicking). The following table notes the distances measured.

| | |
|---|---|
| Latex 1 (as Example 4) | 1.1 mm |
| Latex 2 (as Example 4) | 1.0 mm |
| Latex 3 (as Example 4) | 1.7 mm |
| Latex 4 (as Example 4) | 0 mm |
| Ethylene vinyl acetate (as Example 5) | 10 mm |
| U.V. Cured acrylic (Example 6) | 1.1 mm |
| Ethylene ethylacrylate (Example 7) | 4.4 mm |

The impregnations can be seen to have a significant effect on liquid uptake. A wicking distance of 10 mm or less more preferaby 5 mm or less is preferred.

EXAMPLE 10

Multifilament fibres as described in Examples 1–7, were woven into a fabric as disclosed above and were laminated with low density polyethylene, for example by extrusion coating to form a composite structure. This was formed into a heat-recoverable splice case according to known techniques.

A sleeve produced as described was recovered over a cable splice as shown in FIG. 3b. In order to reenter the enclosure a central portion of the splice case was removed by making two circumfential cuts through it, one at each end of the splice thus leaving the end portion in position on the cables (FIG. 4a). A second sleeve was recovered over the old end portions thus bridging the splice (FIG. 4b).

After allowing the splice closure to cool it was subjected to an internal pressure of 100 KPa for 15 minutes while submerged in water. No air escaped from the closure thus indicating a perfect seal around the splice. No air was able to leak away via the multifilament glass fibres impregnated as defined above.

This was followed by a temperature cycling test. The closure was internally pressurized to 40 KPa and isolated, ie maintaining a pressure of 40 KPa at room temperature, variable as a function of temperature. The enclosed splice was subjected to a temperature cycle of –30° to +60° C., one complete cycle being twelve hours. No pressure loss was seen after completion of 15 cycles.

For comparision, the above procedure was repeated, but using a heat recoverable splice case made using 68 Tex glass with no blocking material present. Upon reentry and reclosure and subsequent pressurization, air was seen to leak profusely via the ends of the multifilament glass. Similar air leaks were seen at the onset of temperature cycling.

For the avoidance of doubt, it is noted that the invention provides various methods, composites and recoverable articles that are blocked or planar tight, or that any one or more of the fibres, fabrics, articles, composites, and blocking materials and methods may be selected. Also, any combination of the various features defined in the various claims may be combined.

We claim:

1. A radially-recoverable sleeve formed of composite material comprising dimensionally-recoverable matrix material and circumferentially-extending multifilament reinforcement fibres, and having heat softenable fibers that, at least after recovery, at least hinder the passage of fluid from the directions selected from the group consisting longitudinally along interstices of the fibres, along outer surfaces of the fibres between the fibres and the matrix material, and longitudinally along interstices of the fibres and also along outer surfaces of the fibres between the fibres and the matrix material, said sleeve having hybrid fibres combined from at least two different fibre types, comprising at least:

a) strength fibres, and
b) said heat softenable fibers formed from or in the form of fibres that will block
   interstices of the fibres on at least one of:
      i) heating of the composite material,
      ii) compression of the composite material, and
      iii) irradiation of the composite material.

2. A composite material according to claim 1, in which the matrix material is cross-linked.

3. A composite material according to claim 2, in which the matrix material is cross-linked by grafted hydrolysable silane groups.

4. A composite material according to claim 1, in which the multifilament fibres are present as at least part of a fabric.

5. A composite material according to claim 1, in the form of a wraparound sleeve.

6. A composite material according to claim 1, in which the multifilament fibres comprise glass.

7. A composite material according to claim 1, in which the multifilament fibres comprise said hybrid fibres.

8. A composite material according to claim 1, in which said heat softenable fibres are selected from the group consisting of polyethylene, polypropylene, nylon, polycaprolactam, polyester, polyvinyledine chloride, and polyvinyl chloride; the reinforcement fibres are selected from the group consisting of a cross-linked polyolefin, glass, carbon fibre, silica staple fibre, polyaramid, polyether ketone, acrylonitrile, and a metal.

9. A composite material according to claim 8, in which said heat softenable fibres comprise heat-softenable polyethylene fibres.

10. A composite material according to claim 1, in which the matrix material comprises cross-linked polyethylene.

11. A composite material according to claim 1, in which the heat-softenable fibres comprise a material that degrades under irradiation.

12. A composite material according to claim 1, in which the hybrid fibres have a core of a single fibre.

13. A composite material according to claim 1, in which the matrix material is in the form of a layer or layers applied to one or each surface of a set of the fibres.

14. A composite material according to claim 13, in which the matrix is applied to the fibres by extrusion coating.

15. A composite material according to claim 1, in which the fibres extend through the matrix material.

16. A composite material according to claim 15, in which the matrix is applied to the fibres by extrusion coating.

17. A composite material according to claim 1, in which the hybrid fibres comprise or were formed from continuous strength fibres and continuous heat-softenable fibres commingled together.

18. A composite material according to claim 1, in which hybrid fibres include fibres formed from core-spun continuous strength fibres and surrounding heat-softenable fibres, the resulting hybrid fibres having been heat-treated before combination with the matrix material.

19. A composite material according to claim 1, in which the hybrid fibres comprise or were formed from a blend of staple strength fibres and staple heat-softenable fibres.

20. A composite material according to claim 1, in which the hybrid fibres comprise or were formed from continuous strength fibres surrounded by a polymer sheath to the outside of which is adhered staple heat-softenable fibres.

21. A composite material according to claim 1 in which the hybrid fibres include fibres formed from continuous strength fibres and continuous heat-softenable fibres running substantially mutually parallel.

22. A composite material according to claim 1, in which the strength fibres and heat-softenable fibres are twisted together.

23. A composite material according to claim 1 which the hybrid fibres are selected from the group consisting of strength fibres wrap-spun with outer coatings comprising heat-softenable fibres, or cores comprising-softenable fibres wrap-spun with outer coatings comprising strength fibres.

24. A composite material according to claim 1, in which the hybrid fibres were formed by a method which comprises cabling together continuous strength fibres and continuous heat-softenable fibres.

25. A composite material according to claim 1, in which the hybrid fibres comprise cores of strength fibres surrounded by sheaths of heat-softenable fibres, cores having tex values of 2–3000 and cores plus sheaths having tex values of 10–1000.

26. A composite material according to claim 1, in which the strength fibres have tenancity values of at least 0.03 Newton per tex at 120° C.

27. A composite material according to claim 1 in which said heat-softenable fibers and selected from the group consisting of a material that degrades under irradiation, a material degradation product of such a material and the matrix material cross links under irradiation, the matrix material is a cross-linked product thereof, and the matrix material cross-links under irradiation and is a cross-linked product thereof.

28. A composite material according to claim 1, which the multifilament fibres are heat-stable.

29. A composite material according to claim 1, which additionally comprises heat-shrinkable fibres.

30. A composite material according to claim 1, in which the matrix material is bonded to the fibres thus preventing passage of fluid along the outer surfaces of the fibres between the fibres and the matrix material.

* * * * *

UNITED STATES PATENT AND TRADEMARK OFFICE
CERTIFICATE OF CORRECTION

PATENT NO. : 5,645,906
DATED : July 8, 1997
INVENTOR(S) : Park et al.

It is certified that error appears in the above-identified patent and that said Letters Patent is hereby corrected as shown below:

Cover Page: Reference cited (56) replace "01170225A3" by --0117025A3--.
Column 2, Line 6 before "recoverable" insert --(i)--.
Column 2, Line 66 replace "rex" by --tex--.
Column 4, Line 48 after "and" insert --copending--.

Signed and Sealed this

Tenth Day of March, 1998

Attest:

BRUCE LEHMAN

Attesting Officer

Commissioner of Patents and Trademarks